(12) United States Patent
Wang et al.

(10) Patent No.: US 9,712,448 B2
(45) Date of Patent: *Jul. 18, 2017

(54) PROXY SERVER, HIERARCHICAL NETWORK SYSTEM, AND DISTRIBUTED WORKLOAD MANAGEMENT METHOD

(75) Inventors: Wen Jie Wang, Shanghai (CN); Hai Shan Wu, Beijing (CN); Bo Yang, Beijing (CN); Yi Xin Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1514 days.

This patent is subject to a terminal disclaimer.

(21) Appl. No.: 13/430,948

(22) Filed: Mar. 27, 2012

(65) Prior Publication Data

US 2012/0254413 A1   Oct. 4, 2012

(30) Foreign Application Priority Data

Mar. 30, 2011   (CN) .......................... 2011 1 0077714

(51) Int. Cl.
*H04L 12/815*   (2013.01)
*H04L 29/08*    (2006.01)
*H04L 12/851*   (2013.01)

(52) U.S. Cl.
CPC .......... *H04L 47/22* (2013.01); *H04L 67/1097* (2013.01); *H04L 67/16* (2013.01); *H04L 47/2425* (2013.01)

(58) Field of Classification Search
None
See application file for complete search history.

(56) References Cited

U.S. PATENT DOCUMENTS 7,228,354 B2 *  6/2007  Chambliss et al. ........... 709/229
7,305,431 B2 * 12/2007  Karnik et al. ................ 709/203
(Continued)

FOREIGN PATENT DOCUMENTS

CN        1805365 A     7/2006  ............. H04L 12/24
CN      200983594 Y    11/2007  ............... H04B 7/26
(Continued)

OTHER PUBLICATIONS

Tanenbaum, Andrew S. Computer Networks. 5th ed. Boston: Pearson Education, 2011. Print.*
(Continued)

*Primary Examiner* — Scott B Christensen
*Assistant Examiner* — Lam Do
(74) *Attorney, Agent, or Firm* — Ido Tuchman; Jennifer R. Davis (57) ABSTRACT

A proxy server and a hierarchical network system and a distributed workload management method. According to one embodiment of this disclosure, the proxy server includes: a rate controller configured to, based on measured request-related information and service quality parameters relative to service levels of requests, periodically determine a dispatch rate for requests of each service level, wherein the sum of the dispatch rate for respective service levels is less than or equal to a predetermined rate; and a request dispatcher configured to dispatch the requests of the corresponding service level in accordance with the dispatch rate determined by the rate controller. One aspect of the disclosure realizes a low overhead, highly scalable, simple and efficient workload management system to achieve QoS assurance and overload protection.

10 Claims, 5 Drawing Sheets

(56) References Cited

U.S. PATENT DOCUMENTS

| | | | |
|---|---|---|---|
| 7,720,971 B2 | 5/2010 | Moutafov | |
| 7,725,901 B2* | 5/2010 | Gissel et al. | 718/105 |
| 7,738,452 B1 | 6/2010 | O'Rourke et al. | |
| 7,822,860 B2 | 10/2010 | Brown et al. | |
| 8,145,761 B2* | 3/2012 | Liu et al. | 709/226 |
| 8,341,265 B2* | 12/2012 | Abdelal et al. | 709/225 |
| 8,667,138 B2* | 3/2014 | Ganesan et al. | 709/226 |
| 2002/0107962 A1* | 8/2002 | Richter et al. | 709/225 |
| 2004/0003087 A1* | 1/2004 | Chambliss et al. | 709/226 |
| 2004/0064557 A1* | 4/2004 | Karnik et al. | 709/225 |
| 2004/0111506 A1* | 6/2004 | Kundu | H04L 67/42 709/223 |
| 2004/0162901 A1 | 8/2004 | Mangipudi et al. | 709/225 |
| 2004/0194095 A1* | 9/2004 | Lumb et al. | 718/100 |
| 2005/0165925 A1* | 7/2005 | Dan et al. | 709/224 |
| 2006/0236324 A1* | 10/2006 | Gissel et al. | 718/105 |
| 2008/0215749 A1* | 9/2008 | Bala et al. | 709/233 |
| 2009/0150565 A1 | 6/2009 | Grossner et al. | |
| 2009/0222544 A1* | 9/2009 | Xiao et al. | 709/223 |
| 2010/0042450 A1 | 2/2010 | Binswanger et al. | |
| 2010/0235355 A1 | 9/2010 | Carter et al. | |
| 2010/0251008 A1 | 9/2010 | Swildens | |
| 2011/0145392 A1* | 6/2011 | Dawson et al. | 709/224 |
| 2011/0276951 A1* | 11/2011 | Jain | 717/140 |
| 2011/0292792 A1* | 12/2011 | Zuo et al. | 370/230 |
| 2012/0066371 A1* | 3/2012 | Patel et al. | 709/224 |

FOREIGN PATENT DOCUMENTS

| | | | | |
|---|---|---|---|---|
| CN | 101232339 A | 7/2008 | | H04H 60/71 |
| CN | 101662413 A | 3/2010 | | H04L 12/56 |

OTHER PUBLICATIONS

Kalt, Christophe. "Internet relay chat: Client protocol." (2000).*

Liu, Xue, et al. "Online response time optimization of apache web server." Quality of Service—IWQoS 2003. Springer Berlin Heidelberg, 2003. 461-478.*

Levy, R., Nagarajarao, J., Pacifici, G., Spreitzer, M., Tantawi, A., Youssef, A., "Performance Management for Cluster Based Web Services," 2003, http://link.springer.com/chapter/10.1007/978-0-387-35674-7_29.*

Lu, Lei, Cherkasova, Ludmila, Persone, Vittoria de Nitto, Mi, Ningfang, Smirni, Evgenia, "AWAIT: Efficient Overload Management for Busy Multi-tier Web Services under Bursty Workloads," 2010, http://link.springer.com/chapter/10.1007/978-3-642-13911-6_6.*

Revanuru, Naresh, Workload Management in Weblogic Server 9.0, Mar. 7, 2006.

Platform Symphony™ Foundations, Introduction to Platform Symphony, Dec. 2008, : http://old.my.platform.com/docs/symphonyde/4.1/print/foundations_sym.pdf.

Novell Identity Manager 4 Unifies Identity and Access Management for Physical, Virtual and Cloud Environments, May 20, 2010.

Managing System z Mainframe SOA Environments—Strong IBM z/OS SOA Software Advances Key (Whitepaper), 1st Edition Jan. 2007 URL: ftp://129.35.224.112/software/zseries/library/ManagingSystemzSOAenvironments-SoftwareStrategies_WP.pdf.

Sudeikat, J et. al., Shoaling Glassfishes: Enabling Decentralized Web Service Management, Self-Adaptive and Self-Organizing Systems, Sep. 14 2009, pp. 291-292, Germany.

* cited by examiner

PROXY SERVER, HIERARCHICAL NETWORK SYSTEM, AND DISTRIBUTED WORKLOAD MANAGEMENT METHOD

CROSS REFERENCE TO RELATED APPLICATION

This application claims priority under 35 U.S.C. 119 from Chinese Application 201110077714.9, filed Mar. 30, 2011, the entire contents of which are incorporated herein by reference.

BACKGROUND OF THE INVENTION

Field of the Invention

The present disclosure relates to network traffic management techniques, and more specifically, to a method and system for distributed workload management of network applications in a hierarchical network system.

Description of the Related Art

Hierarchical network systems, such as cloud computing environments, are increasingly becoming widely adopted. Such systems include, for example, front-end HTTP servers, a middle layer of proxies, and a back-end layer of application servers and/or databases. The HTTP server layer filters out invalid or malicious requests, and then forwards valid requests to the proxy layer. The proxy layer then routes those requests to a selected application server and/or database.

With the development of cloud computing, the concept of supplying a resource as a service is put forward, emphasizing the importance of flexible control of overload protection and quality of service (hereinafter referred to as QoS) assurance. As a result, workload management has become increasingly important in hierarchical network systems. Commonly, workload management occurs mostly between layers of a proxy and backend server.

Many efforts have now been made on workload management in hierarchical network systems, which can be divided into two categories: centralized and distributed workload management.

Centralized workload management has now been primarily adopted in hierarchical network systems. That is, a center unit is relied upon to collect information and make decisions about request dispatching in a hierarchical network system.

In centralized management architecture, using a centralized controller to manipulate traffic flowing through proxies is widely practiced. A central management unit in the centralized controller is responsible for collecting and reviewing the workload arrival rate and the response time thereof, thereby managing the workload applied to a backend server. In some cases, the management decision is made in a centralized form and is implemented in a distributed manner by multiple servers in the proxy layer. In most situations, however, the decision is made and implemented in a centralized manner.

In this centralized management, it is necessary to pre-collect information about backend application servers, such as CPU usage and/or memory usage and the execution time of each request, and process the information to obtain several statistical data samples. The central management unit may acquire some prior knowledge through a training/learning procedure based on those samples, and then the workload management of incoming traffic can be enabled based on the prior knowledge. Usually, the deployment of such a centralized controller may require professional skills, leading to a large system overhead for workload management, suffering from a high implementation complexity, and consuming a large amount of time. Moreover, with centralized management, all management functions stay in a single server, and in this case it is difficult to improve its scalability as every server has its own capability limitations. Further, there is another serious issue with centralized management, i.e., if the central management unit fails, the resource will be utilized insufficiently in the case of the unbalanced load among clusters, and to an even extent, the workload management of the whole system will be disabled.

In distributed management architecture, traffic engineering is usually optimized through distributed controllers in the Internet. Implemented within the transport layer of the OSI protocol stack, such a distributed controller does not rely upon information from the backend servers to work, such as information about CPU/memory usage of the backend servers, and the like. The distributed controller resorts to information collected in the transport layer, such as packet loss rate, data transmission rate and other hardware-related information, and thus takies no account of serviced application-based information, such as request priority, request response time, and other information relative to requesting applications (e.g., client type, service requirement, and the like). Therefore, the distributed controller fails to distinguish between the services provided for front-end requests, and thus is incapable of providing different QoS assurances for different service levels, and is also unable to protect backend application servers from overload.

Confronting traffic from a large number of applications deployed in a cloud environment, it is a challenge to guarantee Service Level Agreements (SLA) requirements from clients with various resource requirements and workload characteristics.

Therefore, there is a need for an improved method and system capable of distributed workload management for network applications in a hierarchical network system.

BRIEF SUMMARY OF THE INVENTION

In order to overcome these deficiencies, the present invention provides a proxy server, including: a rate controller configured to, based on measured request-related information and service quality parameters relative to service levels of requests, periodically determine a dispatch rate for requests of each service level, wherein a sum of the dispatch rate for respective service levels is less than or equal to a predetermined rate; and a request dispatcher configured to dispatch the requests of the corresponding service level in accordance with the dispatch rate determined by the rate controller.

According to another aspect, the present invention provides a hierarchical network system, including: at least one proxy server, including: a rate controller configured to, based on measured request-related information and service quality parameters relative to service levels of requests, periodically determine a dispatch rate for requests of each service level, wherein a sum of the dispatch rate for respective service levels is less than or equal to a predetermined rate; and a request dispatcher configured to dispatch the requests of the corresponding service level in accordance with the dispatch rate determined by the rate controller; and an application server configured to serve the at least one proxy server, including: a resource detector configured to periodically detect a current usage of resources of the application server and a current request arrival rate; a maximum rate calculator configured to, based on the detected current resource usage, the current request arrival rate and a target usage of the resource, calculate a maximum admitted rate of requests for a next management cycle; and a rate distributor configured to distribute the maximum admitted rate for each proxy server as its predetermined rate based on a predetermined policy.

According to yet another aspect, the present invention provides a method for distributed workload management in hierarchical network system, including: periodically determining a dispatch rate for requests of each service level based on measured request-related information and service quality parameters relative to service levels of requests, wherein a sum of the dispatch rate for respective service levels is less than or equal to a predetermined rate; and dispatching the requests of the corresponding service level in accordance with the determined dispatch rate.

DETAILED DESCRIPTION OF THE PREFERRED EMBODIMENTS

In the following discussion, many details are provided to aid in a thorough understanding of the present invention. It will be obvious to those skilled in the art that the scope of the present invention does not change in the absence of such details. It shall be appreciated that any special terms used below are merely for description, and thus it is not intended for the present invention to be limited to those specific applications represented and/or implied with such terms.

According to an embodiment of the present invention, an integrated design and process architecture is provided to enable a local decision based on limited information, wherein on the proxy server side, different allowed rates can be allocated to different request classes or service levels to achieve service differentiation and fairness, while on the application server side, the maximum request arrival rate that is allowed by the application server is calculated based on limited information.

On the proxy server side, a utility function is designed in an embodiment of the present invention to control the allocation of rates used to dispatch requests from different queues to application servers, so as to achieve service differentiation and fairness. The goal of such rate allocation for different classes by a proxy server is to manage the QoS of different service levels to achieve service differentiation. In an embodiment, the QoS requirement is specified in terms of target response time and importance of requests.

The utility function is a function used to associate the measured request-related information with the QoS requirement following a constraint that the sum of the rate for all queues is less than or equal to the admitted total rate acquired from a backend server. The request-related information measured on the proxy server can include, for example, the average request arrival rate of each queue, the average queue length, the current response time of each queue, and the like.

The relationship between dispatch rates for different queues and the current response time can be established through a queuing model to determine the dispatch rate for each queue such that the sum of the utility function is optimized (in an embodiment, it is minimized). A goal to be achieved by the present invention is: a service class with a higher importance will have such a priority that its response time requirement can be satisfied, but no service class will be starved (i.e., being disregarded or having a very low dispatch rate).

On the application server side, the maximum admitted request arrival rate corresponding to the proxy server is calculated and sent to the proxy server. Instead of an accurate model, a self-adaptive method is used on the application server side to estimate the resource requirement. The calculation is based on very limited information about the server, including target resource usage (e.g., 90% CPU), current resource usage (e.g., CPU load), request arrival rate, and/or other information as desired. Such information can be represented in a script. Further, it is not necessary for the device performing the calculation to be integrated with the application server. The calculation consumes very limited CPU resources, thus having no interference with server loads.

Below, an embodiment of the present invention will be illustrated with reference to the drawings.

Figure 1:
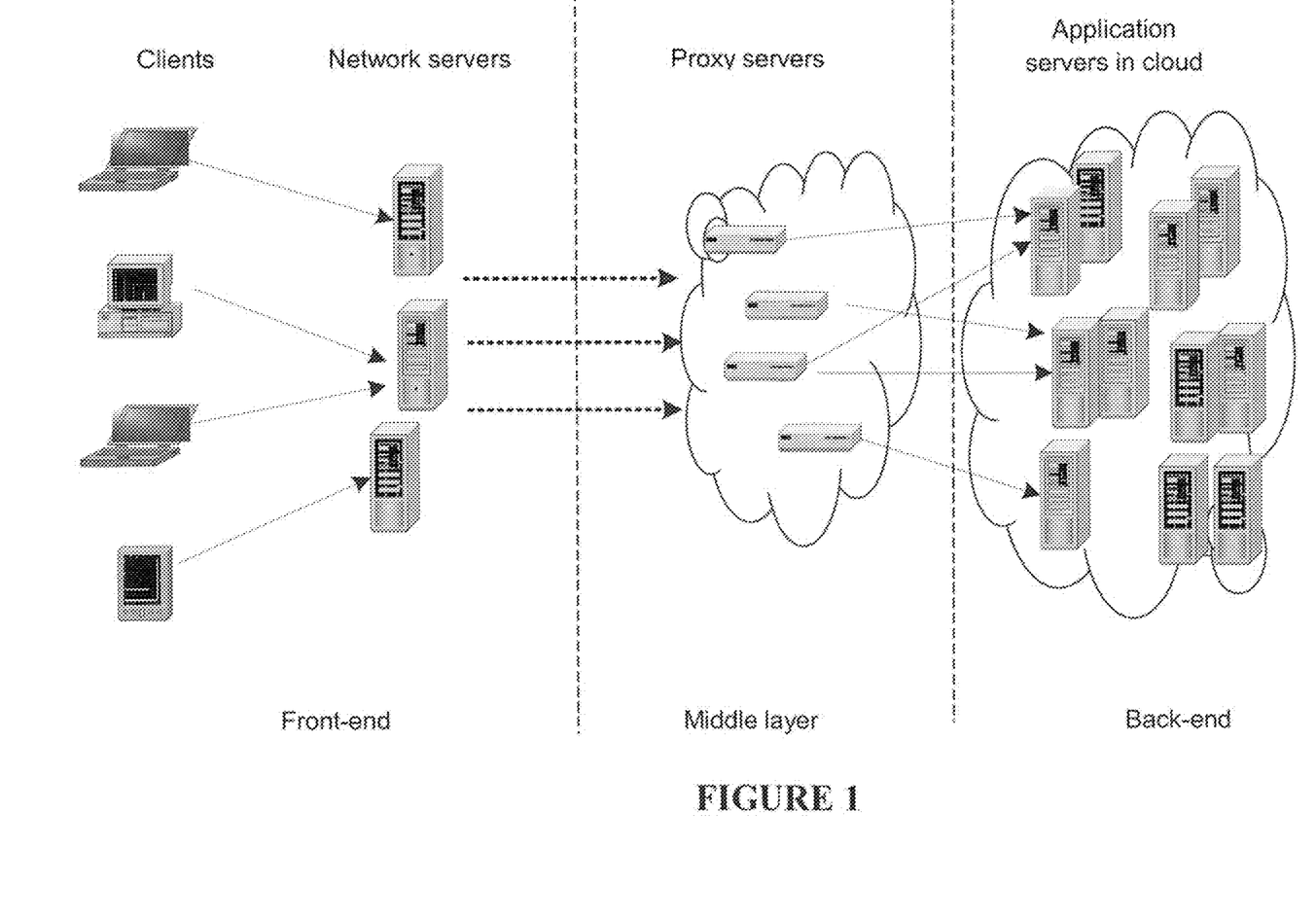
FIG. 1 is an illustrative view of a hierarchical system in which the present invention can be implemented.

FIG. 1 shows an illustrative view of a hierarchical system in which an embodiment of the present invention can be implemented. As shown in FIG. 1, the hierarchical system includes a layer of clients/network servers (i.e., front-end), a layer of proxy servers (i.e., middle layer), and a layer of application servers (i.e., back-ends). The workload management according to this disclosure involves the middle layer and the back-ends.

Figure 2:
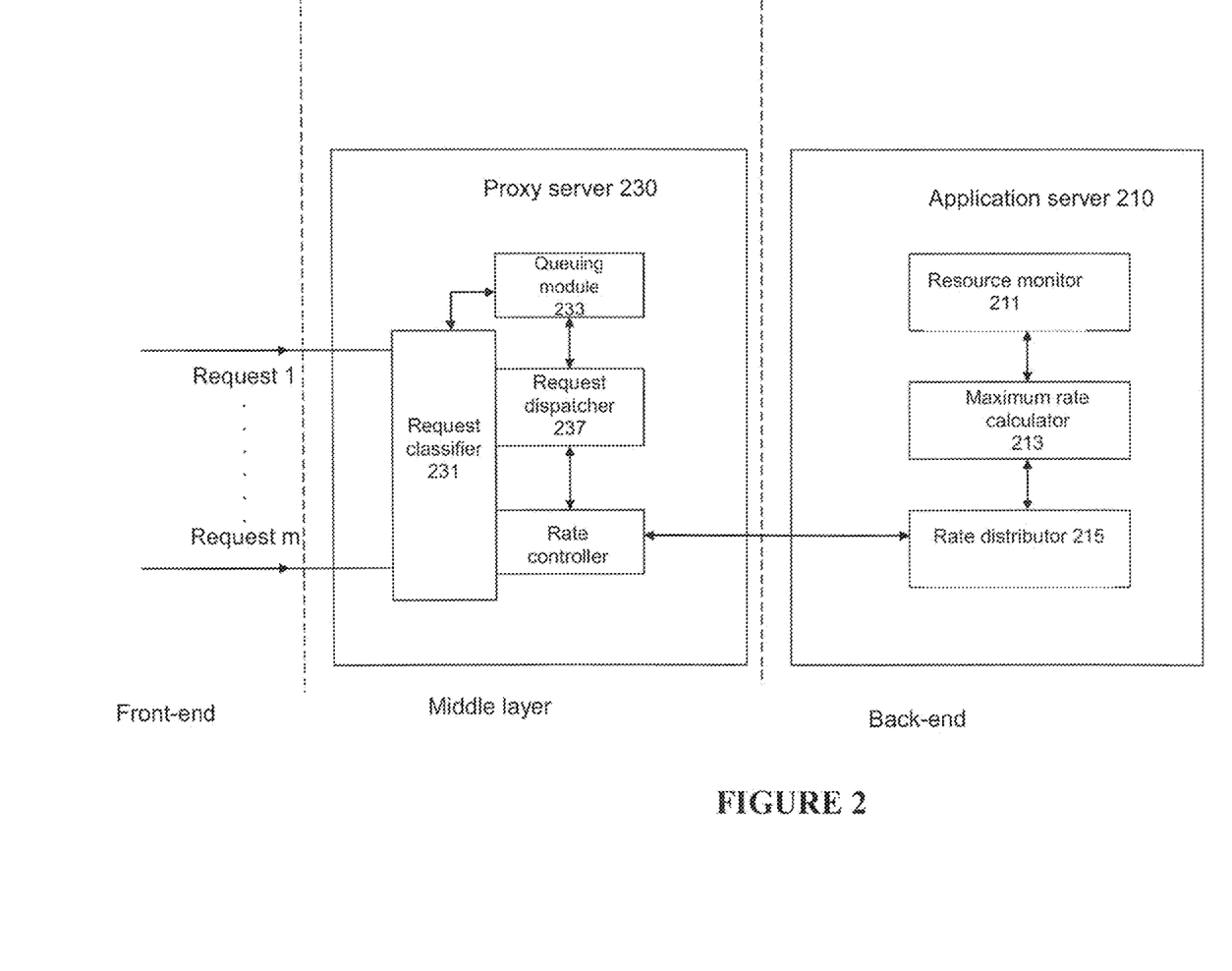
FIG. 2 illustrates a schematic structural block diagram of a hierarchical system capable of workload management according to an embodiment of this disclosure.

FIG. 2 illustrates a schematic structural block diagram of a hierarchical system capable of the workload management according to an embodiment of the present invention. As shown in FIG. 2, the front-end includes one or more clients, which may send requests for resources to the back-end application servers through the proxy servers.

The middle layer includes one or more proxy servers, each of the proxy servers may receive a request for resources from a client it served, and then based on the maximum allowed rate(s) provided by the back-end application server(s), dispatch the received request to a corresponding application server at a dispatch rate corresponding to the service level of the received request.

A default dispatch rate can be set in the proxy server, that is, so that rates allocated to all service classes are even. Each service class is set with a target response time and an importance value. Upon arrival at the proxy, a request can be classified into its service class. Each service class maintains a queue and a request dispatcher (e.g., credit-based) to manage its dispatch rate. If the system is not overloaded, the length of every queue should be zero. As the system gets overloaded, the requests of a service class with lower priority will increase the load for management and queuing, and thus experience a longer response time. An internal calculation cycle adjusts the dispatch rate for each queue based on the correlation between the estimated current dispatch rate and the QoS requirement received.

The back-end includes one or more application servers, each of which may calculate its respective maximum arrival rate allowed based on its own limited information, and then send it to the corresponding proxy server(s).

As appreciated by those skilled in the art, each application server may serve one or more proxies, and each proxy server can accept services provided by one or more application servers as well. Application servers can learn the state of proxy servers automatically. This can be done as application servers initially receive requests from a proxy. Alternatively, application servers can send requests in a poll manner to learn about proxies that need to use their resources.

As shown in FIG. 2, the proxy server 230 includes a request classifier 231, a queuing module 233, a rate controller 235, and a request dispatcher 237.

The request classifier 231 receives requests from the clients, and classifies the received requests into different service levels. The classification can be conducted based upon the QoS requirement of each request. The QoS requirement is represented by, for example, the target response time of the request and its importance, which are normally predetermined based on the Service Level Agreement (SLA) between a client and a service provider.

For instance, requests can be divided into three classes: gold, silver, and bronze. For requests of the gold class, its target response time can be 10 ms and its importance is high; for requests of the silver class, its target response time can be 20 ms and have a moderate importance; and for requests of the bronze class, its target response time can be 50 ms and have a low importance.

It should be noted that the request classifier 231 is optional. A request from the client itself can be tagged to indicate the corresponding service level it belongs to.

The queuing module 233, which is also optional, is used to maintain one or more request queues, e.g., different queues corresponding to different request service levels. For example, three request queues Q1, Q2 and Q3 can be set up in the queuing module 233 for the maintenance queues of gold, silver, and bronze classes, respectively.

The rate controller 235 may periodically calculate a dispatch rate for each service level based on the information from the application server 210 and the QoS requirement of each service level. The calculation cycle of the rate controller 235 may be or may not be in synchronization with the management cycle of the backend application server, and it is not critical for this disclosure.

The rate controller 235 receives from the application server 210 by which it is served with resources a maximum arrival rate for the requests arrived from the rate controller 235. The rate controller 235 also detects the current response time of each service level and retrieves the target response time and the importance of each service level. It should be noted that the term "current response time" used herein refers to an actual request response time during a current calculation cycle.

First, in order to correlate the current response time of the request of each service level with the dispatch rate of each service level, the rate controller 235 establishes a queuing model for each queue corresponding to an individual service level based on the queuing theories in the art. The queuing model may formulate the relationship between the dispatch rate r and the response time T as a function of T=f(r) for each request queue.

It should be noted that the sum of the dispatch rates of all of the queues should be less than or equal to the maximum arrival rate allocated to the proxy server 230 by the application server 210. Such a constraint can be represented as:

$$\sum_{i=1}^{I} r = r\max \quad (1)$$

wherein, i ($1 \leq i \leq I$) is an integer index for a queue; and I is an positive integer to indicate the number of the service levels, i.e., the number of the queues maintained in the queuing module 233.

Second, in order to achieve service level differentiation and fairness, a utility function is introduced in this disclosure. The utility function is a function to correlate the current response time and the QoS requirement for requests of each service level. Under the constraint (1), the dispatch rate r leading to the extremum of the utility function for each service level is the solution that may meet the QoS requirement. In other words, this disclosure uses a utility function to control the dispatch rate for each queue. Next, the utility function is represented as $D_i$.

The solution that minimizes the sum of the utility function of each request queue will give the higher priority to those service levels with higher importance in terms of target response time requirement, while no service level will be starved.

The utility function according to this disclosure may represent the loss due to the unsatisfied target response time of a service level. A goal of the utility function is to cause no loss to occur if the current response time is less than or equal to the target response time, otherwise, the loss increases linearly. For service levels with the same target response time, in the case that the same amount of time of the current response time exceeds the target response time, a service level with a higher importance will have a lower loss rate.

Figure 3:
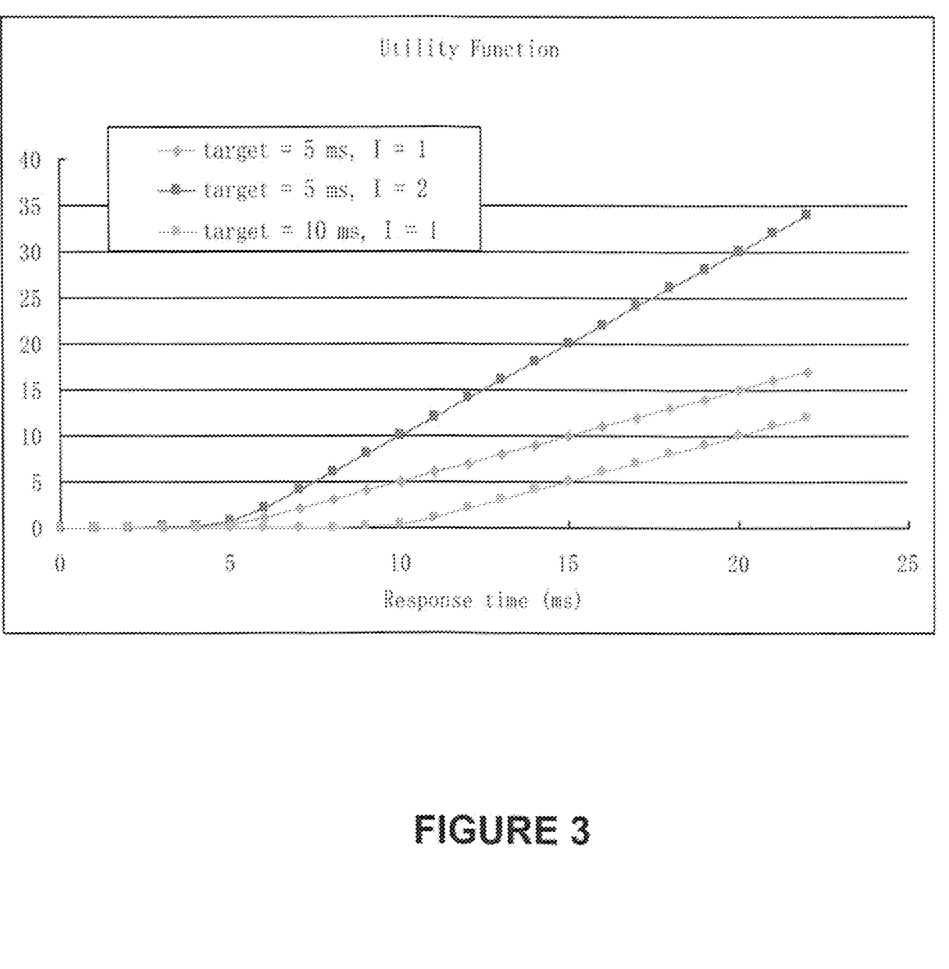
FIG. 3 shows a graph illustrating relationship between loss value obtained with a utility function and current response time, target response time and importance.

FIG. 3 shows a graph illustrating a relationship between loss value obtained with the utility function and current response time, target response time and importance.

As shown in FIG. 3, when the current response time is less than 5 ms, all of the three queues have a loss value 0. When the current response time is over 5 ms, the larger the importance is, the larger the loss is for the same current response time.

According to an embodiment of the present invention, the utility function $D_i$ provided is:

$$D_i(T_i) = \frac{C_i}{2}\left((T_i - d_i) + \sqrt{(T_i - d_i)^2 + 0.5}\right) \quad (2)$$

wherein, $T_i$ is the current request response time of the ith queue, $C_i$ is the importance of the ith queue, and $d_i$ is the target request response time of the ith queue.

Last, the following equation (3) is used to get the dispatch rate for the ith queue:

$$\min D_i(T_i) \quad (3)$$

wherein, min stands for a function for obtaining the minimum.

Solving the equation (3) through substituting T=f(r) and the equation (2), its result is the dispatch rate for the ith queue in the next calculation cycle.

Although it is described above to use the current request response time of each service level to correlate the dispatch rate and the QoS requirement (e.g., its target response time and importance) of each request queue, those skilled in the art will appreciate that it is possible to correlate other attributions (such as, queue length at different time, dispatch rate, arrival rate, waiting time or the like) of a request queue to the QoS requirement using the existing queuing model. Further, although a specific utility function is given above, those skilled in the art will appreciate that other utility functions also can be designed in dependence of particular requirements thereof. For example, the utility function can be formulated with other queue attributions, by separately weighting $T_i$, $C_i$ and $d_i$ or in the form of square and square root, and/or the like.

According to another embodiment of this disclosure, another utility function Di is provided as below:

$$D_i(r_i) = \frac{L_{i,previous\_cycle}}{L_{i,current\_cycle}} * d_i + \frac{L_{i,previous\_cycle}}{L_{i,current\_cycle}} * l_i \text{ and} \quad (4)$$

$$\sum_{i=1}^{I} r = r_{max}$$

wherein, L is queue length, $L_{i,previous\_cycle}$ is the maximum length of the ith queue in the previous calculation cycle, and $L_{i,current\_cycle}$ is the maximum length of the ith queue in the current calculation cycle.

This utility function calculates the weight for the dispatch rate allocated to a corresponding request queue under the constraint (1) based on the QoS requirements of each service level. For example, the dispatch rate of queue 1 is $D_1/(D_1+D_2+D_3) \times r_{max}$; the dispatch rate of queue 2 is $D_2/(D_1+D_2+D_3) \times r_{max}$; and as to the queue 3, its dispatch rate is $D_3/(D_1+D_2+D_3) \times r_{max}$.

Upon the calculation of the dispatch rate of each queue, the rate controller 235 sends the calculated rate value to the request dispatcher 237. The rate controller 235, in response to a maximum rate update received from the application server 210, may update the maximum arrival rate it stored, and the dispatch rate is calculated only once per cycle.

It should be noted that if one proxy server receives resource services from multiple application servers, it is necessary for the rate controller 235 of the proxy server to calculate the dispatch rate for each queue with respect to each application server. The proxy server then may dispatch those requests that need a specific application server to that application server at the rate calculated for that application server.

The dispatcher 237 sends the requests from a corresponding request queue to the application server 210 at the dispatch rate from the rate controller 235.

The dispatcher 237 may also use some methods in the prior art to implement rate control. For example, a token barrel algorithm can be used to accomplish the request rate control. For example, tokens can be checked in a round robin manner to achieve a proper request dispatch rate control.

Also shown in FIG. 2, each backend application server 210 includes a resource monitor 211, a maximum rate calculator 213 and a rate dispatcher 215.

The application server 210 implements rate management periodically. The period can be set by an administrator experimentally, be set as needed or be set in other manners. Each application server 210 has a target resource usage as the upper limits of resources used during its operation. For example, for an application server, its CPU usage can be set to 60% and its memory usage can be set to 95%. That is, the CPU cycles used by that server during its operation will not exceed 60% of the total cycles, and the memory space used may not exceed 95% of the total memory space.

The resource monitor 211 periodically detects the current usage of resources on the application server and the current request arrival rate. The resources may include CPU usage, memory usage, I/O, and bandwidth or the like. The period refers to the management cycle of the application server during which the detection described above is implemented. Some or all of the detected information and the target resource usage can be used to adjust the maximum allowable arrival rate for a whole management cycle.

The maximum rate calculator 213 calculates the maximum allowable rate at which the application server 210 may receive requests during the next management cycle based on the information detected by the resource monitor 211 and predetermined target resource usages.

Next, by way of example, an embodiment of maximum arrival rate calculation is presented, supposed that: the resource is a CPU cycle, the target resource usage is the upper limit of CPU usage, and a proportional-integral (PI) controller is used by the application server. For this application server, the maximum allowable request arrival rate is:

$$R(j)=R(j-1)+(K_p+K_j)*e(j)-K_p*e(j-1) \quad (5)$$

Wherein, j is the jth management cycle; R(j) is the maximum allowable request arrival rate calculated for the jth management cycle; e(j) is the difference of target usage and the actual resource usage measured in the jth management cycle; and $K_p$, $K_j$ are common parameters used in PI controller technologies, which are set to experimental values in practice.

In this workload management system, a typical scenario is that a positive e(j) can always be observed if the actual workload of the application server is far less than the largest capacity of the application server. This causes a continuous increase in the maximum admitted arrival rate of the application server. If there is a sharp increase in the actual workload that can meet the recently updated maximum admitted arrival rate, the application server is prone to suffer from a serious overload. In this situation, R(j−1) in the equation (5) is substituted with R'(j−1), and R'(j) represents the actual arrival rate measured in the jth management cycle. That is, the actual request arrival rate measured in the j−1th management cycle is used as a basis to calculate the maximum request arrival rate in the jth management cycle.

In such a workload management system, it is also possible to observe a slight difference between the sampled actual admitted rate and the calculated maximum arrival rate. This is because of errors in statement. The allowable rate will slowly decrease if the calculated allowable rate is slightly larger than the sampled admitted rate. This also tends to cause system overload. In this case, the equation (5) above can be modified as:

$$R(j)=\text{Min}(R(j-1),R'(j-1))+(K_p+K_j)*e(j)-K_p*e(j-1) \quad (6)$$

Wherein, Min is a function to take the minimal one of R(j−1) and R'(j−1).

As another embodiment of the present invention, the maximum request arrival rate can be calculated by the application server as below. The rate calculator 213 calculates a threshold allowable arrival rate of the application server based on the target resource usage of the application server. The rate calculator 213 then proportionally calculates the maximum admitted request arrival rate based on the current resource usage from the resource detector 211. For example, $$R(j)=\text{resource usage of previous cycle/target resource usage}*R_{threshold}$$

The description above merely illustrates some examples of calculating the maximum admitted request arrival rate by the application server. Certainly, those skilled in the art can calculate the maximum admitted request arrival rate of the application server in other manners while meeting the target resource usage requirement.

The rate dispatcher 215 may allocate the maximum admitted rate to respective proxy servers as predetermined rates thereof based on a predetermined policy. Since the application server 210 may serve multiple proxies, the sum of the request arrival rate allocated to respective proxies by the rate dispatcher 215 should be equal to its calculated maximum allowable arrival rate.

The rate dispatcher 215 may adopt several policies to allocate its admitted arrival rate to each proxy. For example, the policy can be that of averaged allocation, i.e., evenly allocate the maximum admitted arrival rate to the proxies. For example, if the maximum admitted arrival rate calculated by the rate calculator 213 is 100 requests/s and the application server 210 needs five proxy servers to provide resource service, then the request rate prescribed by the rate dispatcher 215 for each proxy is 20 request/s. A new rate is allocated to different proxy server 230 based on the policy.

Alternatively, the rate dispatcher 215 can receive descriptive information from proxies, such as request arrival rate, queuing description or other necessary information. Based on the received information, the rate dispatcher 215 can allocate a different request arrival rate to each proxy.

Figure 4:
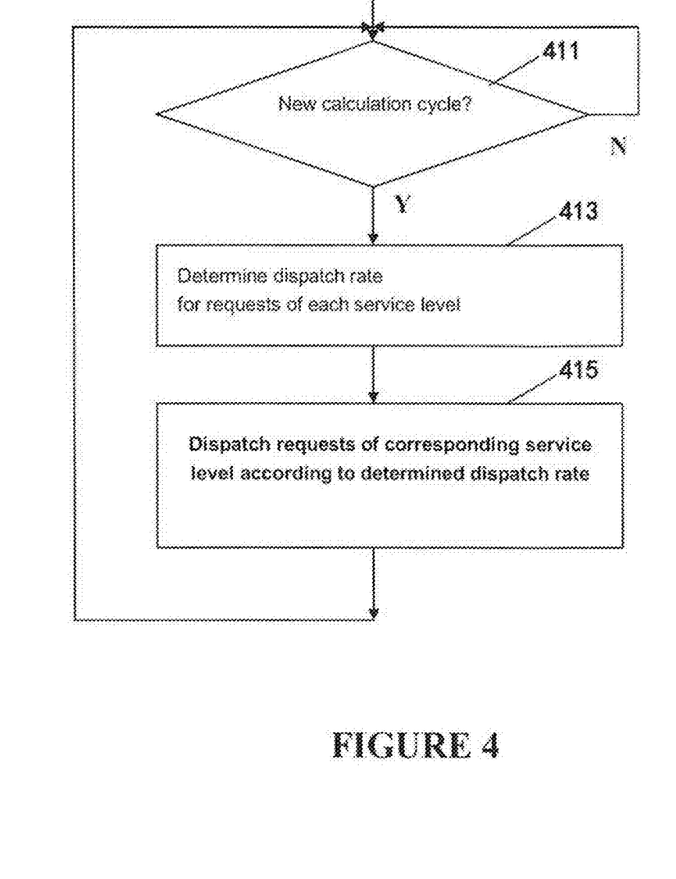
FIG. 4 illustrates a schematic flowchart of a workload management process implemented on a proxy server according to an embodiment of this disclosure.

FIG. 4 illustrates a schematic flowchart of the workload management process implemented on the proxy server according to the embodiment of this disclosure.

At step 411, it is determined whether a new computing cycle starts. If not, the process continues to wait. Otherwise, the process proceeds into step 413.

At step 413, based on the request-related information measured and service quality parameters relative to the service levels of requests, the dispatch rate for the requests of each service level is determined, wherein the sum of the dispatch rate of respective service levels are less than or equal to a predetermined rate.

At step 415, requests are dispatched for a corresponding service level according to the determined dispatch rate.

The detailed operations of steps 413 and 415 are described in detail with reference to the proxy server 230 as shown in FIG. 2, and hence will not be repeated herein.

Next, the process returns to step 411, waiting for the start of the next management cycle.

Figure 5:
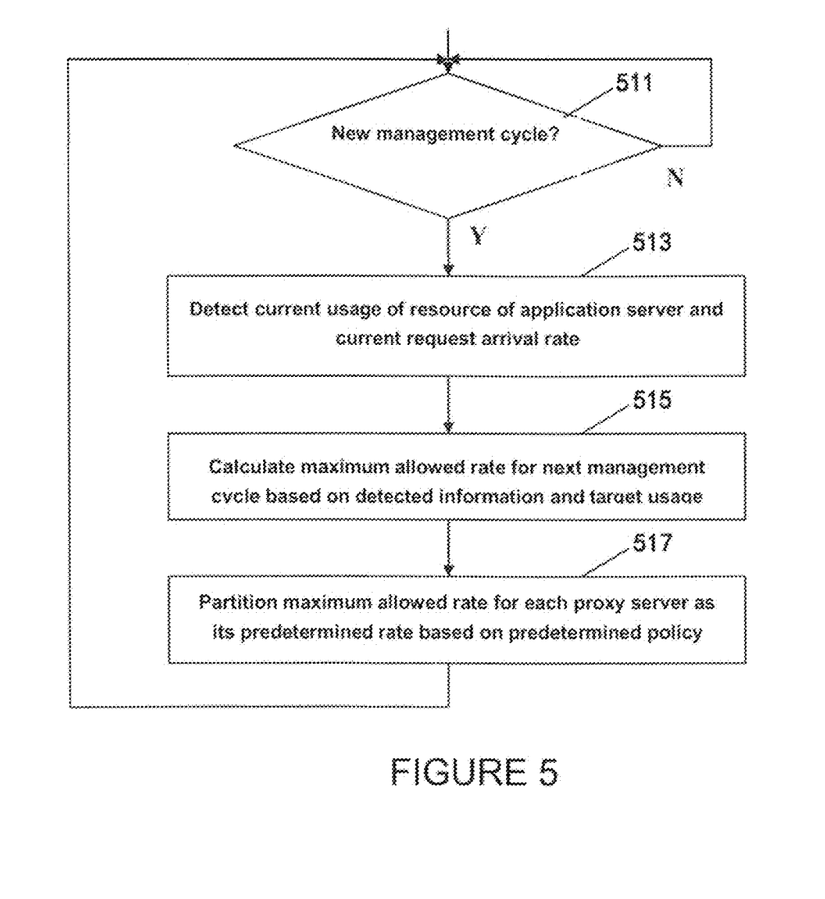
FIG. 5 illustrates a schematic flowchart of a workload management process implemented on an application server according to an embodiment of this disclosure.

FIG. 5 illustrates a schematic flowchart of the workload management process implemented on the application server according to an embodiment of the invention.

At step 511, it is determined whether a new control cycle starts. If not, the process continues to wait. Otherwise, the process proceeds to step 513.

At step 513, the current usage of resources of the application server and the current request arrival rate are detected.

At step 515, based on the detected current resource usage and the current request arrival rate and a target resource usage, a maximum admitted request rate for the next management cycle is calculated.

At step 517, based on a predetermined policy, the maximum admitted rate is allocated to each proxy as its predetermined rate.

The detail operations in steps 513, 515 and 517 has been described above with reference to the application server 210 as shown in FIG. 2, and will not be repeated herein.

Next, the process returns to step 511, waiting for the start of the next management cycle.

One embodiment according to an aspect of the invention may provide one or more of the following advantages:

1. Low overhead: this distributed solution may avoid too much overhead since there is very limited information communicated between proxy server and application server. Too much overhead may increase system complexity in maintenance and management.

2. Priority and Fairness: These are typical requirements for workload management. Flows with higher priority may get better QoS assurance; but no flow should be starved.

3. Less instrumentation needs to be installed on back-end servers.

4. Quick convergence: The system should converge quickly along with different characteristic of load. Controlling solutions requiring long training period may not work well. Quick convergence can be achieved with addition or deletion of different system components in the present embodiment.

5. Resilient and adaptive: It should be able to deal with a combination of different workload types. Additionally, it should involve less human intervention or configurations.

As will be appreciated by one skilled in the art, the present invention can be embodied as a system, method or computer program product. Accordingly, the present invention may take the form of an entirely hardware embodiment, an entirely software (including firmware, resident software, micro-code, etc.) embodiment or an embodiment combining software and hardware aspects that may all generally be referred to herein as a "circuit," "module" or "system." Furthermore, the present disclosure may take the form of a computer program product embodied in any tangible medium of expression having computer usable program code embodied therein.

Any combination of one or more computer usable or computer readable medium(s) can be utilized. The computer-usable or computer-readable medium can be, for example but is not limited to, an electronic, magnetic, optical, electromagnetic, infrared, or semiconductor system, apparatus, device, or propagation medium. In the context of this document, a computer-usable or computer-readable medium can be any medium that can contain, store, communicate, propagate, or transport the program for use by or in connection with the instruction execution system, apparatus, or device. The computer-usable medium may include a data signal by which the computer-usable program code embodied propagates either in baseband/or as part of a carrier wave. The computer usable program code can be transmitted using any appropriate medium, including but not limited to wireless, wireline, optical fiber cable, RF, etc.

The flow charts and block diagrams in the diagrams illustrate a hierarchical architecture, function and operation likely implemented by the system, method and computer program product according to various embodiments of the present disclosure. At this point, each block in the flow charts or block diagrams may represent a module, a program segment, or a part of code, the module, the program segment, or the part of code including one or more executable instructions for implementing a prescribed logical function. It should be noted that, in some alternative implementations, the functions noted in the blocks may also occur in a sequence different from what is noted in the diagrams. It should also be noted that each block in the block diagrams and/or flow charts and a combination of blocks in block diagrams and/or flow charts can be implemented by a dedicated hardware-based system for executing a prescribed function or operation or can be implemented by a combination of dedicated hardware and computer instructions.

The embodiment is selected and described to best explain the principles of the disclosure and its practical application to thereby enable others skilled in the art to understand that various embodiments is possible with various modifications as suited to the particular purpose contemplated. The description of this disclosure is given for illustration and description, and is not exhaustive or intended to limit the disclosure to the form stated. Thus, various changes and modifications can be effected by one skilled in the art without departing from the spirit or scope of the invention.

What is claimed is:

1. A method for distributed workload management in hierarchical network system, comprising:
    maintaining, by a proxy server, a plurality of queues each corresponding to a different service level;
    periodically determining, by the proxy server, a dispatch rate for requests for a current processing cycle of each of the service levels based on measured request-related information and service quality parameters relative to service levels of requests, wherein the measured request-related information is measured by the proxy server for a previous processing cycle, the periodically determining comprising:
        associating, by the proxy server, the measured request-related information with the service quality parameters for the respective service levels according to a utility function, wherein the utility function represents a loss due to unsatisfied target response times of the respective service levels and is specified in terms of target response time and an importance of the requests;
        calculating, by the proxy server, the dispatch rate for the corresponding service level by minimizing the utility function, wherein a sum of said dispatch rate for respective service levels is less than or equal to a predetermined rate specifying a maximum admitted rate to the proxy server; and
    dispatching, by the proxy server, the requests of said corresponding service level in accordance with said determined dispatch rate to the plurality of application servers.

2. The method according to claim 1, wherein said measured request-related information is a current request response time, and said service quality parameters comprise a target response time and an importance of said requests of the corresponding service level.

3. The method according to claim 1, wherein periodically determining a dispatch rate for requests of each service level comprises:
    correlating said measured request-related information and said service quality parameters relative to service levels of requests by using a utility function;
    correlating the measured request-related information and the dispatch rate through a queuing model.

4. The method according to claim 1, wherein said predetermined rate is determined by an application server serving for a proxy server in said hierarchical network system, independent of said information about said proxy server.

5. The method according to claim 1, further comprising:
    receiving requests from clients, and classifying said requests into one or more service levels; and
    maintaining one or more request queues, wherein different queues correspond to different service levels of requests.

6. The method according to claim 1, wherein said predetermined rate is obtained through:
    periodically detecting a current usage of a resource of said application server in said hierarchical network system and a current request arrival rate;
    calculating a maximum allowable rate of requests for the next management cycle based on said detected current resource usage, said current request arrival rate and a target usage of the resource; and
    allocating said maximum allowable rate to each proxy server in said hierarchical network system as its predetermined rate based on a predetermined policy.

7. The method according to claim 6, wherein said predetermined policy is to evenly allocate said maximum allowed rate to said proxy server.

8. The method according to claim 6, wherein said resources comprises at least one of CPU usage, memory usage, I/O, and bandwidth.

9. The method according to claim 8, wherein when said resource is CPU usage, said maximum rate calculator adopts a proportional-integral controller technology to calculate said maximum allowed rate.

10. The method according to claim 6, wherein the calculation period of said proxy server is in synchronization with said management cycle of the application server.

* * * * *